US010774812B2

(12) United States Patent
Tanno

(10) Patent No.: US 10,774,812 B2
(45) Date of Patent: Sep. 15, 2020

(54) POWER GENERATION SYSTEM

(71) Applicant: The Yokohama Rubber Co., LTD., Minato-ku, Tokyo (JP)

(72) Inventor: Atsushi Tanno, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 538 days.

(21) Appl. No.: 15/310,425

(22) PCT Filed: May 12, 2015

(86) PCT No.: PCT/JP2015/063610
§ 371 (c)(1),
(2) Date: Nov. 10, 2016

(87) PCT Pub. No.: WO2015/174405
PCT Pub. Date: Nov. 19, 2015

(65) Prior Publication Data
US 2017/0218924 A1 Aug. 3, 2017

(30) Foreign Application Priority Data

May 12, 2014 (JP) ................................ 2014-098780

(51) Int. Cl.
*B60C 19/00* (2006.01)
*F03D 1/00* (2006.01)
(Continued)

(52) U.S. Cl.
CPC ............. *F03D 9/32* (2016.05); *B60B 21/12* (2013.01); *B60C 19/00* (2013.01); *B60C 99/00* (2013.01); *F03D 1/06* (2013.01); *F03D 9/11* (2016.05); *F03D 9/25* (2016.05); *F03D 13/10* (2016.05); *H02K 7/183* (2013.01); *H02K 7/1807* (2013.01); *B60B 7/20* (2013.01); *F05B 2240/941* (2013.01);
(Continued)

(58) Field of Classification Search
CPC .................................................... B60C 19/00
See application file for complete search history.

(56) References Cited

U.S. PATENT DOCUMENTS 9,194,362 B2 * 11/2015 Merlini, III ............... F03D 1/04
2004/0007302 A1 * 1/2004 Hamilton ................. B60C 23/12
152/416

(Continued)

FOREIGN PATENT DOCUMENTS

CN 102328594 1/2012
CN 202215426 5/2012
(Continued)

OTHER PUBLICATIONS https://www.energydigital.com/renewable-energy/japanese-breakthrough-wind-turbine-design, 2011.*
(Continued)

*Primary Examiner* — Justin R Fischer
(74) *Attorney, Agent, or Firm* — Thorpe North & Western

(57) ABSTRACT

Provided is a power generation system capable of efficiently converting wind power into electric power. The power generation system comprises: a pneumatic tire; a wheel on which the pneumatic tire is mounted; and at least one generator wind turbine attached, in a cavity defined by the pneumatic tire and the wheel, to the pneumatic tire and/or the wheel.

15 Claims, 13 Drawing Sheets

(51) Int. Cl.
  *F03D 9/32* (2016.01)
  *F03D 9/11* (2016.01)
  *F03D 9/25* (2016.01)
  *F03D 13/10* (2016.01)
  *B60B 21/12* (2006.01)
  *B60C 99/00* (2006.01)
  *H02K 7/18* (2006.01)
  *F03D 1/06* (2006.01)
  *B60B 7/20* (2006.01)

(52) U.S. Cl.
  CPC ......... *H02K 7/1838* (2013.01); *H02K 7/1846* (2013.01); *Y02E 10/721* (2013.01); *Y02E 10/725* (2013.01); *Y02E 10/728* (2013.01)

(56) References Cited

U.S. PATENT DOCUMENTS

| | | | |
|---|---|---|---|
| 2007/0063829 A1 | 3/2007 | Chien et al. | |
| 2010/0026009 A1* | 2/2010 | Sarwin | F03D 9/11 290/55 |
| 2015/0090380 A1* | 4/2015 | Steenwyk | B60C 19/00 152/152.1 |
| 2015/0266385 A1* | 9/2015 | Lang | B60L 11/182 320/108 |

FOREIGN PATENT DOCUMENTS

| | | | |
|---|---|---|---|
| DE | 10055882 | * | 5/2002 |
| DE | 102010044625 | * | 3/2012 |
| DE | 102011122563 | * | 6/2013 |
| DE | 102012219062 | * | 4/2014 |
| DE | 20 2013 104 618 | | 1/2015 |
| JP | H02-055556 | | 2/1990 |
| JP | 10-305799 | * | 11/1998 |
| JP | 3063771 | | 11/1999 |
| JP | 2002-079815 | | 3/2002 |
| JP | 2003-239845 | | 8/2003 |
| JP | 2004-090884 | | 3/2004 |
| JP | 2008-087512 | | 4/2008 |
| KR | 2005003595 | * | 1/2005 |
| KR | 10-1394552 | | 5/2014 |
| WO | WO 2011/140687 | * | 11/2011 |
| WO | WO 2015/002467 | | 1/2015 |

OTHER PUBLICATIONS

International Search Report for International Application No. PCT/JP2015/063610 dated Aug. 11, 2015, 2 pages, Japan.

* cited by examiner

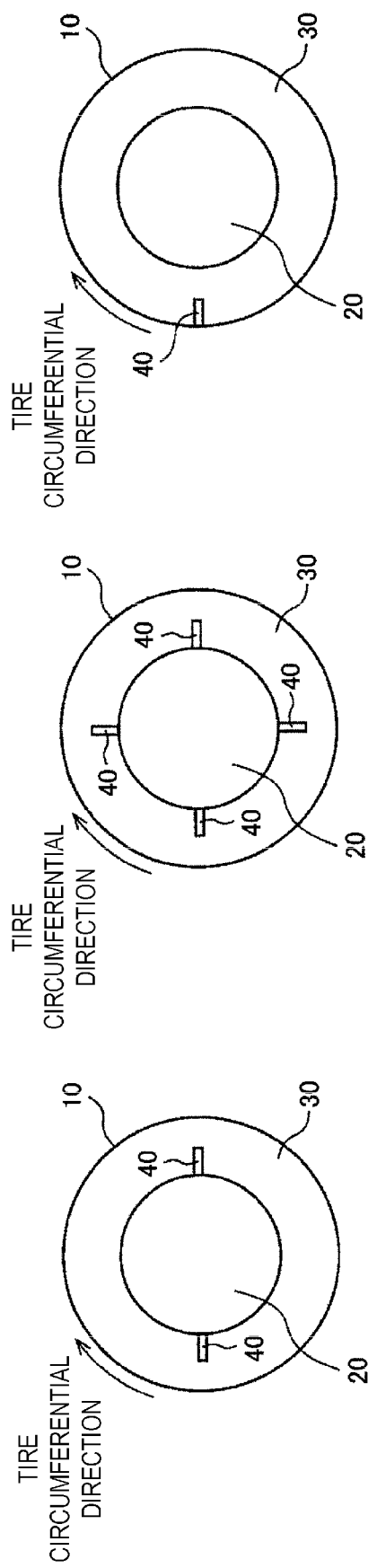
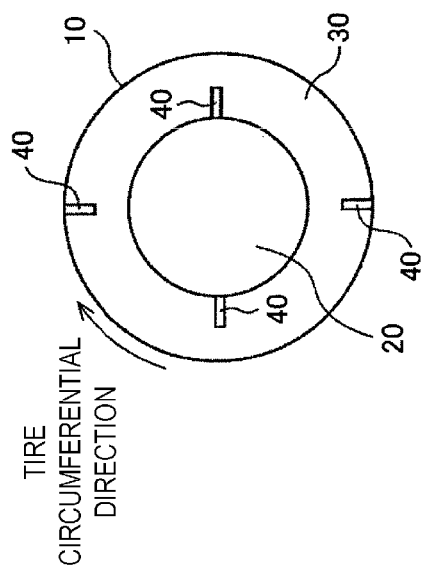
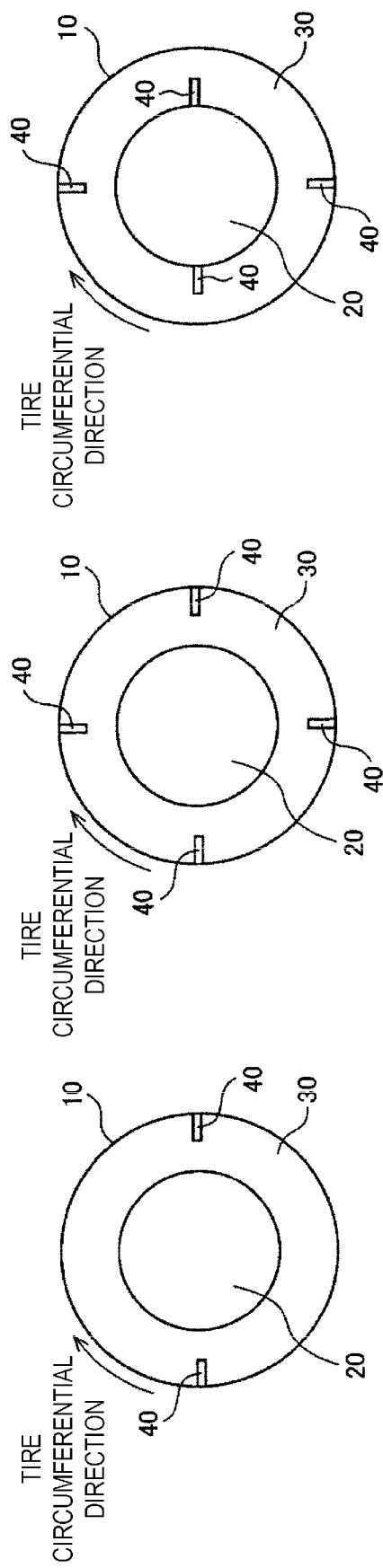

POWER GENERATION SYSTEM

TECHNICAL FIELD

The present technology relates to a power generation system capable of efficiently converting wind power into electric power.

BACKGROUND ART

A vehicle illumination device in which two rotating bodies are mounted on an outer side of a wheel cap (see, e.g., Japanese Unexamined Patent Application Publication No. 2004-90884A), a method of rotating an in-wheel power generator using wind power from outside a wheel cap (see, e.g., Japanese Unexamined Patent Application Publication No. H2-55556A), and the like are known as examples of conventional technology for generating power using the rotational force of a tire.

The techniques disclosed in Japanese Unexamined Patent Application Publication Nos. 2004-90884A and H2-55556A are both techniques that use wind power under atmospheric pressure on the outside of a pneumatic tire. Therefore, the density of the gas that can be used is not in a high state, and thus the wind power cannot be efficiently converted into electric power.

SUMMARY

The present technology provides a power generation system capable of efficiently converting wind power into electric power.

A power generation system according to the present technology includes: a pneumatic tire; a wheel on which the pneumatic tire is mounted; and at least one generator wind turbine attached to the pneumatic tire and/or the wheel in a cavity defined by the pneumatic tire and the wheel.

The power generation system according to the present technology improves upon the position where a generator wind turbine for obtaining electric power is attached. As a result, according to the power generation system of the present technology, wind power can be efficiently converted to electric power.

BRIEF DESCRIPTION OF DRAWINGS

FIG. 6A illustrates a state in which no centrifugal force is acting on the tire and FIG. 6B illustrates a state in which centrifugal force acts on the tire.

FIG. 8A illustrates a type that supplies electric power from the generator wind turbine 40 directly to the exterior via an electric power line 70a, FIG. 8B illustrates a type that supplies electric power from the generator wind turbine 40 to the exterior via an electric power line 70b after first storing electricity in a rechargeable battery via the electric power line 70a, FIG. 8C illustrates a type that supplies electric power from the generator wind turbine 40 directly to various sensors 90 within the system via the electric power line 70a, and FIG. 8D illustrates a type that supplies electric power from the generator wind turbine 40 to the various sensors 90 within the system via the electric power line 70b after first storing electricity in a rechargeable battery via the electric power line 70a.

FIG. 10-1 is a perspective view illustrating a modified example of the generator wind turbine 40 illustrated in FIG. 2.

FIG. 10-2 is a side cross-sectional view of the generator wind turbine 40 illustrated in FIG. 10-1.

FIG. 11A illustrates a modified example of the propeller type illustrated in FIG. 2, FIG. 11B illustrates an example of a multiblade type, FIG. 11C illustrates an example of a paddle type, FIG. 11D illustrates an example of a Savonius type, FIG. 11E illustrates an example of a Darrieus type, and FIG. 11F illustrates an example of a gyromill type.

FIGS. 12A to 12F are side cross-sectional views illustrating arrangements of generator wind turbines in the circumferential direction of a tire that can be applied in the power generation system according to the present technology, where FIGS. 12A and 12B illustrate examples of attaching generator wind turbines to a wheel, FIGS. 12C, 12D, and 12E illustrate examples of attaching generator wind turbines to a pneumatic tire, and FIG. 12F illustrates an example of attaching generator wind turbines to both a wheel and a pneumatic tire.

FIG. 13A illustrates an example in which a single generator wind turbine is arranged in a wheel and FIG. 13B illustrates an example in which a plurality of generator wind turbines are arranged in a wheel.

DETAILED DESCRIPTION

Embodiments of the power generation system according to the present technology (including a Basic Embodiment and Additional Embodiments 1 to 7) will now be described in detail on the basis of the drawings. Note that the present technology is not limited to these embodiments. The constituents of the embodiment include constituents that can be easily replaced by those skilled in the art and constituents substantially the same as the constituents of the embodiment. In addition, the various modes included in this embodiment can be combined as desired within the scope of obviousness by a person skilled in the art.

Basic Embodiment

A basic embodiment of the power generation system according to the present technology will now be described. In the following description, "tire radial direction" refers to a direction orthogonal to the axis of rotation of a pneumatic tire; "inside in the tire radial direction" refers to a side that is near to an axis of rotation in the tire radial direction; and "outside in the tire radial direction" refers to a side that is far from the axis of rotation in the tire radial direction. The "tire circumferential direction" refers to a circumferential direction with the axis of rotation as the center axis. Furthermore, "tire width direction" refers to a direction parallel to the axis of rotation; "inside in the tire width direction" refers to a side that is near to a tire equatorial plane (tire equatorial line) in the tire width direction; and "outside in the tire width direction" refers to a side that is far from the tire equatorial plane in the tire width direction. Note that "tire equatorial plane" refers to a plane that is orthogonal to the axis of rotation of the pneumatic tire and that passes through the center of the pneumatic tire along the width thereof.

Figure 1:
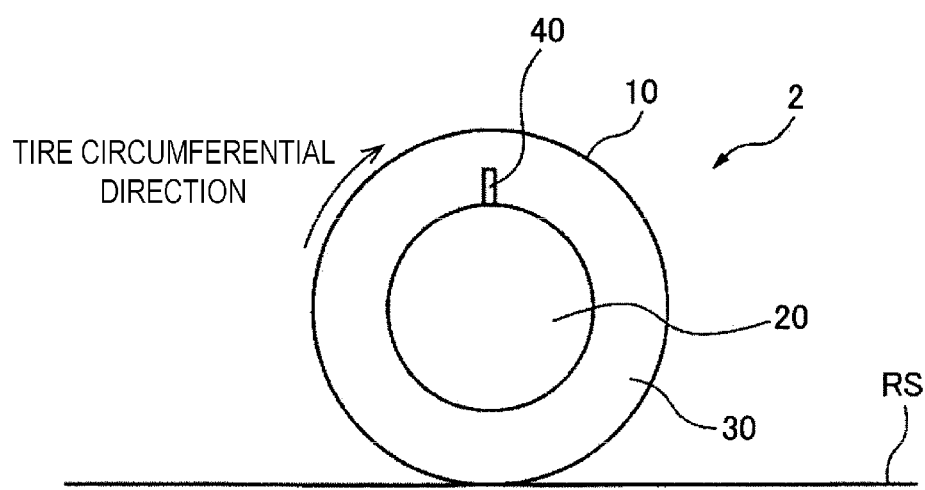
FIG. 1 is a side cross-sectional view illustrating a power generation system according to an embodiment of the present technology.

FIG. 1 is a side cross-sectional view illustrating the power generation system according to an embodiment of the present technology. As illustrated in FIG. 1, a power generation system 2 includes a pneumatic tire 10 (only a surface layer of which is illustrated) and a wheel 20 on which the pneumatic tire 10 is mounted, and a cavity 30 is defined by the pneumatic tire 10 and the wheel 20. In the pneumatic tire 10, the cavity 30 is filled with air. In the power generation system 2 illustrated in FIG. 1, a single generator wind turbine 40 is attached to the wheel 20 in the cavity 30. Note that the generator wind turbine 40 can also be attached to the pneumatic tire 10 in the cavity 30, and a plurality of generator wind turbines 40 may be formed in the cavity 30.

In the power generation system 2 illustrated in FIG. 1, the wheel 20 is a specified rim, the cavity 30 is given a specified internal pressure, and a specified load is imparted on the pneumatic tire 10. In other words, the pneumatic tire 10 and the wheel 20 in the power generation system 2 illustrated in FIG. 1 are in a static loaded state. Note that reference sign RS in FIG. 1 indicates a road surface.

Here, "specified rim" refers to an "applicable rim" as defined by the Japan Automobile Tyre Manufacturers Association (JATMA), to a "Design Rim" as defined by the Tire and Rim Association (TRA), or to a "Measuring Rim" defined by the European Tyre and Rim Technical Organization (ETRTO). "Specified internal pressure" refers to "maximum air pressure" defined by JATMA, a maximum value in "TIRE LOAD LIMITS AT VARIOUS COLD INFLATION PRESSURES" defined by TRA, and "INFLATION PRESSURES" defined by ETRTO. Furthermore, "specified load" refers to "maximum load capacity" defined by JATMA, a maximum value in "TIRE LOAD LIMITS AT VARIOUS COLD INFLATION PRESSURES" defined by TRA, and "LOAD CAPACITY" defined by ETRTO. However, the present embodiment assumes that the specified internal pressure has a range from 200 to 300 kPa and the specified load is from 40 to 90% of the maximum load capacity.

Figure 2:
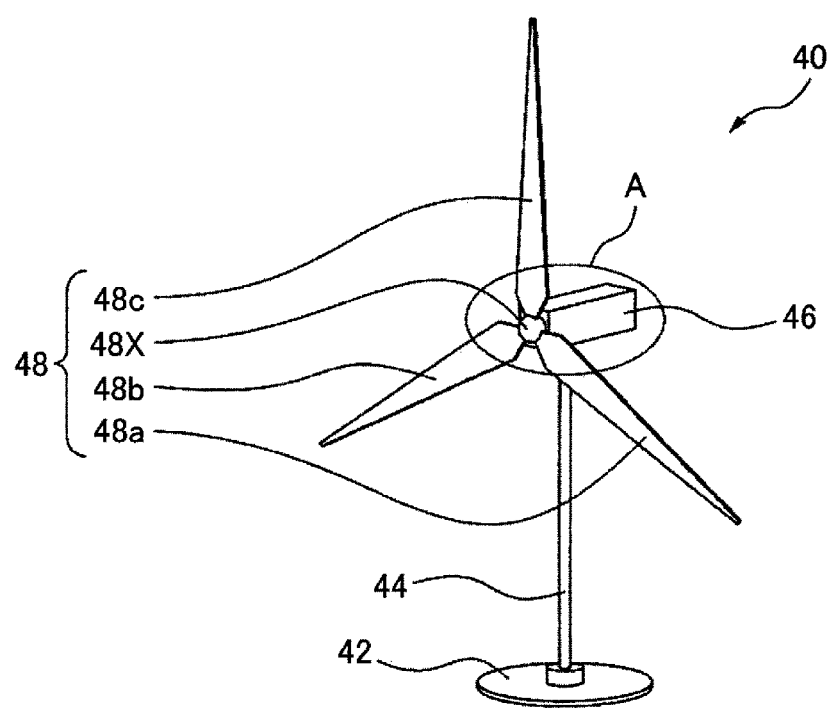
FIG. 2 is a perspective view illustrating a specific example of the configuration of a generator wind turbine 40 (a propeller type) illustrated in FIG. 1.
Figure 3:
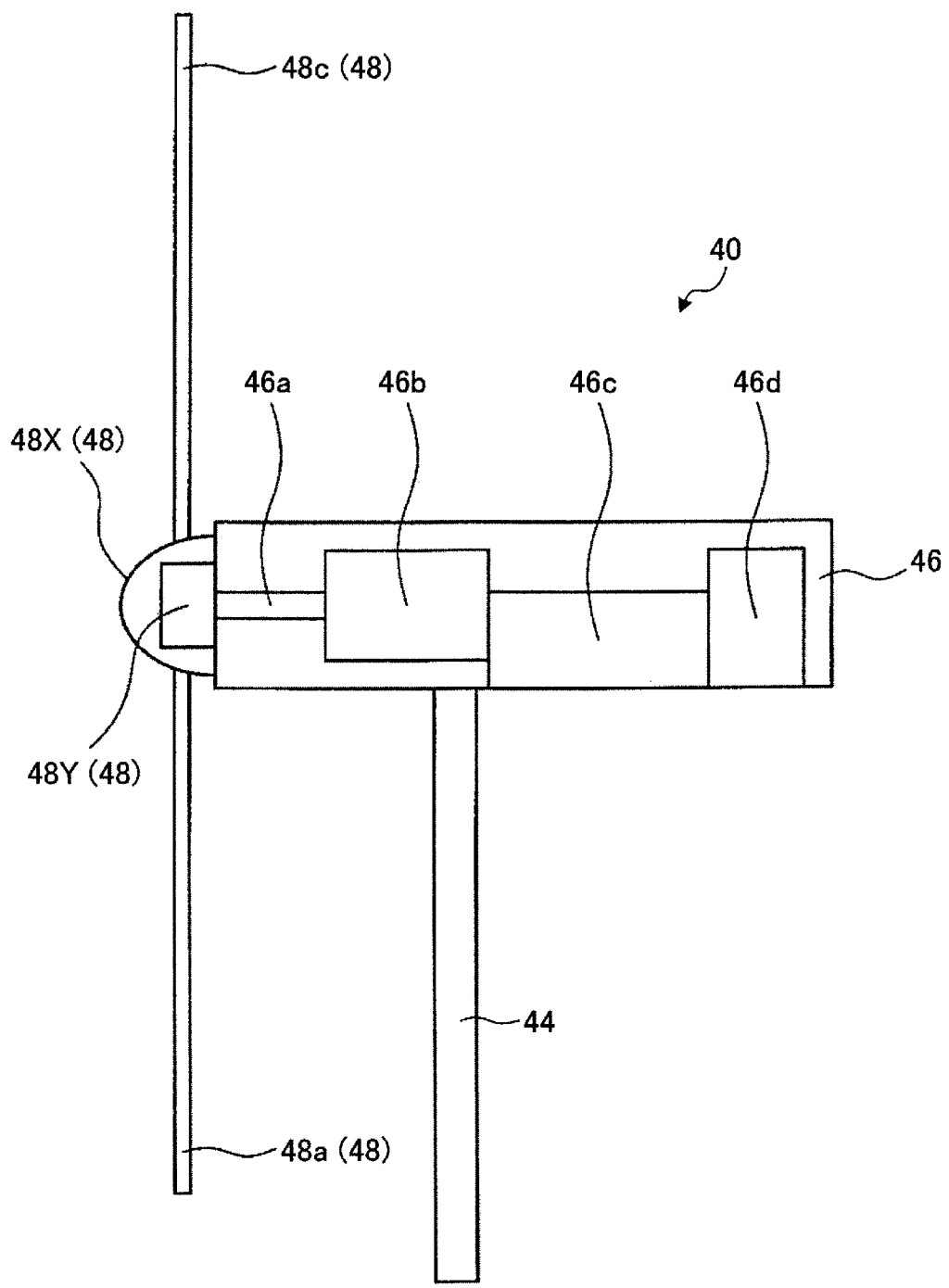
FIG. 3 is a see-through side view illustrating in detail the vicinity of an area A circled in FIG. 2.

FIG. 2 is a perspective view illustrating a specific example of the configuration of the generator wind turbine 40 (a propeller type) illustrated in FIG. 1. FIG. 3, meanwhile, is a side see-through view illustrating in detail the vicinity of an area A circled in FIG. 2. In the example illustrated in FIG. 2, the generator wind turbine 40 includes a base part 42, a tower part 44 extending from the base part 42 in a vertical direction, a nacelle 46 attached to an uppermost part of the tower part 44 in the vertical direction thereof, and a blade part 48 attached to one side of the nacelle 46 in a horizontal direction thereof.

As illustrated in FIG. 2, the base part 42 serves to support the tower part 44, and is a constituent that, in the case where the generator wind turbine 40 is attached to the pneumatic tire 10 or the wheel 20, makes contact with the member 10 or the member 20.

As illustrated in FIG. 2, the tower part 44 serves to support the nacelle 46, and is a constituent that, in the case where the generator wind turbine 40 is attached to the pneumatic tire 10 or the wheel 20, determines a position of the blade part 48 within the cavity 30 in the tire radial direction.

As illustrated in FIG. 2, the nacelle 46 serves to support the blade part 48, and is mainly a constituent that converts wind power to electric power. More specifically, as illustrated in FIG. 3, the nacelle 46 includes: a rotation shaft 46a, linked at one end to the blade part 48, that transfers rotational force of the blade part 48; a step-up gear 46b, linked to another end of the rotation shaft 46a, that amplifies the rotational force of the rotation shaft 46a; a power generator 46c, linked to the side of the step-up gear 46b opposite from the rotation shaft 46a, that converts the rotational force amplified by the step-up gear 46b into electric power; and a transformer 46d, linked to the side of the power generator 46c opposite from the step-up gear 46b, that transforms the electric power obtained by the power generator 46c into a desired voltage.

Note that in the present embodiment, the step-up gear 46b is not a necessary constituent of the nacelle 46. Additionally, rather than being a constituent of the nacelle 46, the transformer 46d may be provided as a separate entity in a region of the power generation system 2 (a secondary battery 80 illustrated in FIG. 8, for example). Furthermore, in addition to these constituents, the nacelle 46 may be provided with a computer or the like for automatically changing an angle of the blade part 48 relative to a principle direction.

As illustrated in FIG. 2, the blade part 48 includes a plurality of (three, in the example illustrated in FIG. 2) blades 48a, 48b, and 48c connected to a rotor head 48X at equal intervals in a rotational direction, and furthermore includes a rotor hub 48Y disposed within the rotor head 48X, as illustrated in FIG. 3. Through such a configuration, the blade part 48 transfers a rotational force of the blades 48a, 48b, and 48c obtained from wind power to the interior of the nacelle 46 via the rotor head 48X and the rotor hub 48Y.

(Actions and the Like)

Figure 4:
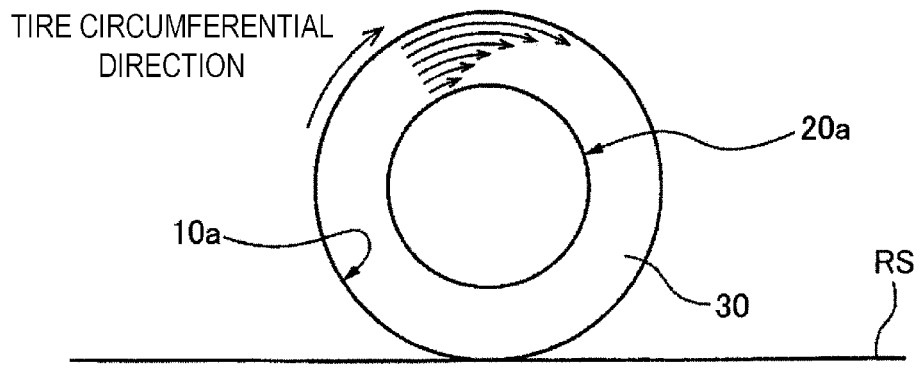
FIG. 4 is a side cross-sectional view illustrating an airflow state in the case where a tire mounted on a vehicle is rolled in a state where no generator wind turbine is formed in a cavity.

FIG. 4 is a side cross-sectional view illustrating an airflow state in the case where a tire mounted on a vehicle is rolled in a state where no generator wind turbine is present in the cavity. In FIG. 4, reference sign 10a indicates an inner surface of the pneumatic tire 10, reference sign 20a indicates a wheel surface, reference sign 30 indicates the cavity, and reference sign RS indicates a road surface. The orientations of the numerous arrows in FIG. 4 indicate an advancement direction of a gas, and the sizes of the arrows represent a speed of the flow of the gas. As illustrated in FIG. 4, in the cavity 30, the airflow is a laminar flow at all locations in the circumferential direction of the tire, and the gas is subjected to a greater centrifugal force, producing a greater airflow speed, toward the outside in the tire radial direction.

Based on such knowledge, in the power generation system 2 according to the present embodiment, at least one generator wind turbine 40 is attached to the pneumatic tire 10 and/or the wheel 20 in the cavity 30 defined by the pneumatic tire 10 and the wheel 20. Because the gas pressure in the cavity 30 is much higher than the outside pressure while the tire is rotating, the gas present in the cavity 30 has a very high density.

Therefore, in the power generation system 2 according to the present embodiment, the generator wind turbine 40 is installed under circumstances in which a high-density gas moves in a laminar flow. As such, in the case where the generator wind turbine 40 moves relative to the gas, the high-density laminar flow gas can collide with the blade part 48 and efficiently rotate the rotation shaft 46a of the nacelle 46, making it possible to obtain electric power efficiently.

The power generation system 2 according to the present embodiment adds an improvement in that the position where the generator wind turbine 40 for obtaining electric power is attached is within the cavity 30, as described above. As a result, according to the power generation system 2 of the present technology, wind power can be converted to electric power efficiently for the above-described reason.

Note that the power generation system 2 according to the present embodiment described above is achieved by attaching the generator wind turbine 40 to at least one of the inner surface 10a of the pneumatic tire 10 and the wheel surface 20a at the stage where a predetermined pneumatic tire 10 and a predetermined specified wheel (specified rim) 20 are combined. When manufacturing the power generation system 2 according to the present embodiment, and particularly when attaching the generator wind turbine 40 as described above, it is necessary to set the tower part 44 of the generator wind turbine 40 illustrated in FIGS. 2 and 3 to an appropriate length so that the generator wind turbine 40 can fit within the cavity 30 without interfering with the inner surface 10a and the wheel surface 20a.

ADDITIONAL EMBODIMENTS

Next, Additional Embodiments 1 to 7, which can be optionally implemented instead of the Basic Embodiment of the power generation system according to the present technology described above, will be described.

Additional Embodiment 1

Figure 5:
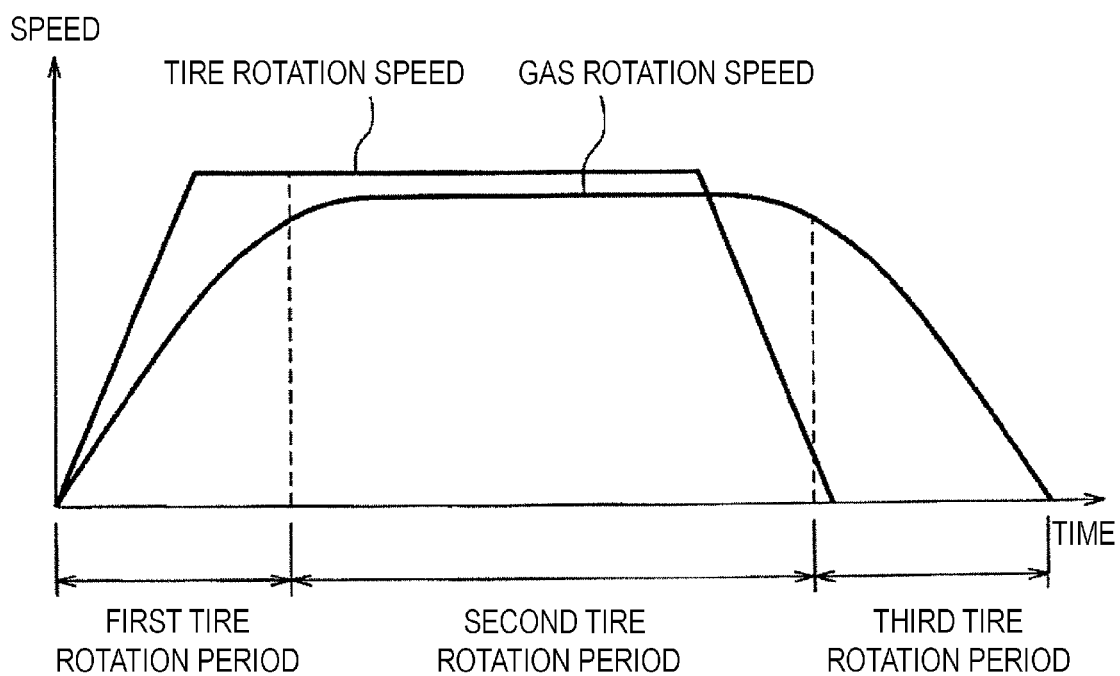
FIG. 5 is a graph illustrating a change over time in a relationship between a rotation speed of a tire and a rotation speed of a gas present in the cavity, in the case of the vehicle (tire) illustrated in FIG. 4 traveling according to a normal travel sequence.

FIG. 5 is a graph illustrating a change over time in a relationship between the rotation speed of a tire and the rotation speed of a gas present in the cavity, in the case of a vehicle (pneumatic tire; also called a "tire" hereinafter) illustrated in FIG. 4 traveling according to a normal travel sequence (that is, when accelerating, rotating at a constant speed, and decelerating).

As illustrated in FIG. 5, a greater inertia force acts on the gas than on the tire when the tire accelerates. Therefore, the rise in the rotation speed of the gas is more gradual than the rise in the rotation speed of the tire. Next, the difference between the inertia force acting on the tire and the inertia force acting on the gas disappears when the tire is rotating at a constant speed. Therefore, the rotation speed of the gas gradually approaches the rotation speed of the tire, and ultimately becomes almost the same as the rotation speed of the tire. Finally, a greater inertia force acts on the gas than on the tire when the tire decelerates, in the same manner as when the tire accelerates. Therefore, the drop in the rotation speed of the gas is more gradual than the drop in the rotation speed of the tire.

In light of these circumstances, a difference between the rotation speed of the tire and the rotation speed of the gas appears in a first tire rotation period (when the tire is accelerating and when the tire begins rotating at a constant speed), as illustrated in FIG. 5. Meanwhile, almost no difference appears between the rotation speed of the tire and the rotation speed of the gas in a second tire rotation period (from partway through a period of the tire rotating at a constant speed to when the tire begins decelerating). Furthermore, a difference appears between the rotation speed of the tire and the rotation speed of the gas in a third tire rotation period (from partway through a period of the tire decelerating).

Based on the above knowledge, in the Basic Embodiment, the above-described generator wind turbine 40 can be fixed to at least one of the above-described pneumatic tire 10 and the above-described wheel 20 (Additional Embodiment 1). The generator wind turbine 40 can be fixed using a typical fastener (a surface fastener, a button, a band, or the like).

In the present embodiment, the generator wind turbine 40 is fixed to at least one of the pneumatic tire 10 and the wheel 20, and thus exhibits the same rotational behavior as the pneumatic tire 10. Therefore, in the present embodiment, power can be generated particularly efficiently in the first tire rotation period and the third tire rotation period indicated in FIG. 5, in which it is thought that the generator wind turbine 40 (the tire 10) and the gas have sufficiently different rotation speeds, or to rephrase, that the generator wind turbine 40 moves relative to the gas.

In particular, fixing the generator wind turbine 40 to the wheel 20 makes the generator wind turbine 40 less susceptible to vibrations when the tire is rotating, making it difficult for vibrations to be transmitted to the generator wind turbine 40 and thus difficult for the generator wind turbine 40 to break. The generator wind turbine 40 can thus be made more durable. On the other hand, the gas flows at a higher speed at the inner surface 10a of the pneumatic tire 10 than in locations closer to the wheel 20, and thus fixing the generator wind turbine 40 to the pneumatic tire 10 makes it possible to generate a large amount of power.

Additional Embodiment 2

In an embodiment in which Additional Embodiment 1 has been added to the Basic Embodiment, the above-described generator wind turbine 40 can be attached to the above-described wheel 20 and can be made rotatable relative to a straight line parallel to an axis of rotation of the tire (not illustrated) (Additional Embodiment 2). The axis of rotation of the tire is a center around which the tire rotates.

Figure 6A:
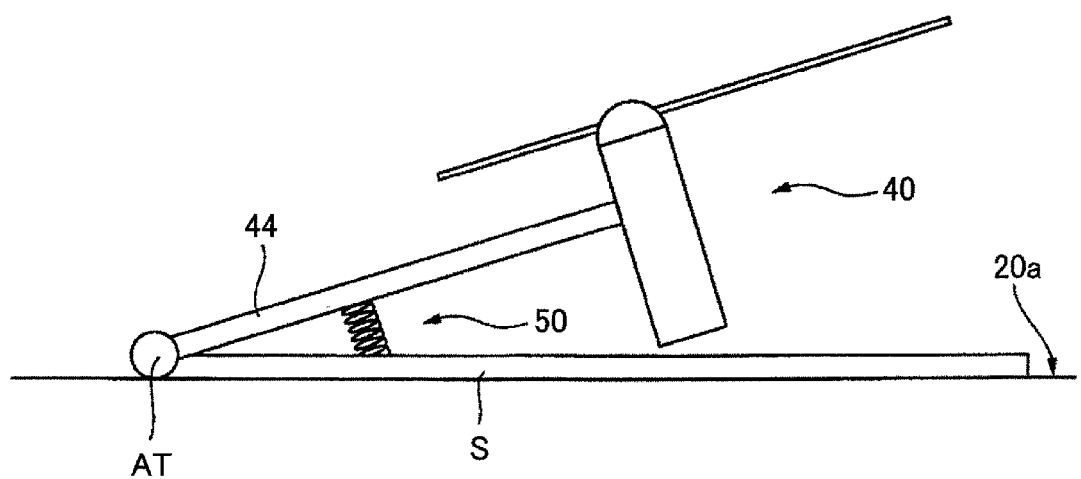
FIGS. 6A and 6B are side views illustrating behavior of a generator wind turbine attached to a wheel when the tire rotates, where
Figure 6B:
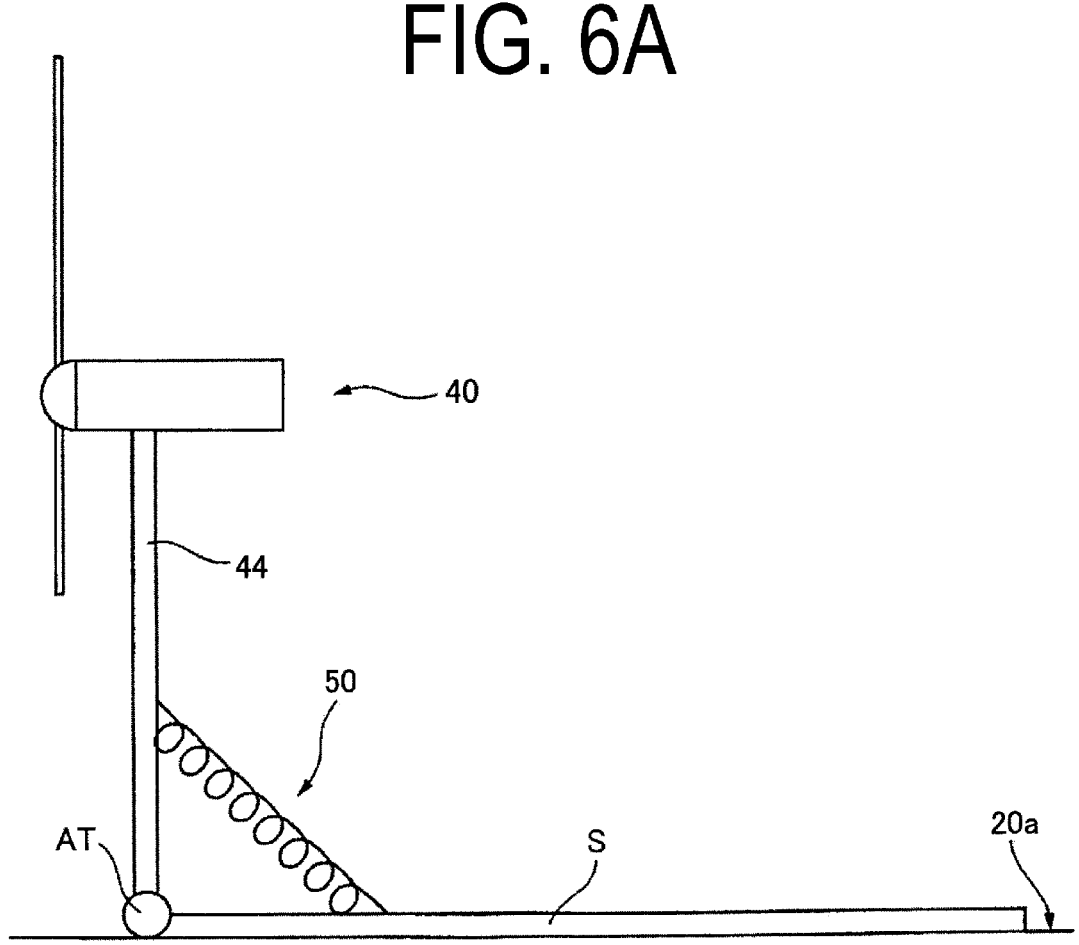

A structure in which an elastic member (a spring, for example) 50 is disposed between a support member S fixed to the wheel surface 20a and the tower part 44 linked to the support member S via a pivot shaft part AT such that the tower part 44 can pivot relative to the support member S, as illustrated in FIGS. 6A and 6B, for example, can be given as an example of structure that enables the generator wind turbine 40 attached to the wheel to rotate relative to a straight line parallel to the axis of rotation of the tire. The pivot shaft part AT is provided so as to follow a straight line parallel to the axis of rotation of the tire. In other words, FIGS. 6A and 6B are side views illustrating the behavior of the generator wind turbine attached to the wheel when the tire rotates. FIG. 6A illustrates a state in which no centrifugal force is acting on the tire, whereas FIG. 6B illustrates a state in which centrifugal force acts on the tire.

Although the elastic member 50 is not a required constituent in the present embodiment, it should be noted that the generator wind turbine 40 can be rotated more gently in the case where the elastic member 50 is used, and thus the generator wind turbine 40 can be made more durable.

The generator wind turbine 40 leans against the wheel surface 20a in a state where no centrifugal force is acting on the tire, or in other words, when the tire is at rest, as illustrated in FIG. 6A. However, in a state where centrifugal force is acting on the tire, such as when the tire is accelerating, the generator wind turbine 40 stands upright relative to the wheel surface 20a and opposes the flow of the gas in a power generating attitude, as illustrated in FIG. 6B. The power generating attitude can be maintained in the case where the generator wind turbine 40 is exposed to wind in a direction that holds the upright position thereof.

According to the present embodiment, having the generator wind turbine 40 lay flat rather than standing upright keeps the generator wind turbine 40 from interfering particularly when fitting the pneumatic tire 10 on the wheel 20, and thus the fitting process can be carried out easily, making it possible to achieve excellent workability when assembling the tire on the rim. Note that the elastic member 50 is, for example, a tension spring having an elastic force in a tensile direction, and a tensile force thereof is set to be lower than the above-described centrifugal force. Thus in a state where no centrifugal force is acting on the tire (when the tire is at rest), the generator wind turbine 40 is pulled in a direction in which the generator wind turbine 40 leans against the wheel surface 20a, as illustrated in FIG. 6A, whereas in a state where centrifugal force is acting on the tire (when the tire is accelerating), the centrifugal force defeats the tensile force and the generator wind turbine 40 stands upright relative to the wheel surface 20a, as illustrated in FIG. 6B. Therefore, the generator wind turbine 40 stands upright only when centrifugal force is produced, and does not interfere when in other states; and the rotation thereof when standing upright is kept gentle by the elastic member 50.

Additional Embodiment 3

In the Basic Embodiment, it is preferable that the above-described generator wind turbine 40 be capable of sliding relative to the above-described pneumatic tire 10 or the above-described wheel 20 (Additional Embodiment 3).

Figure 7:
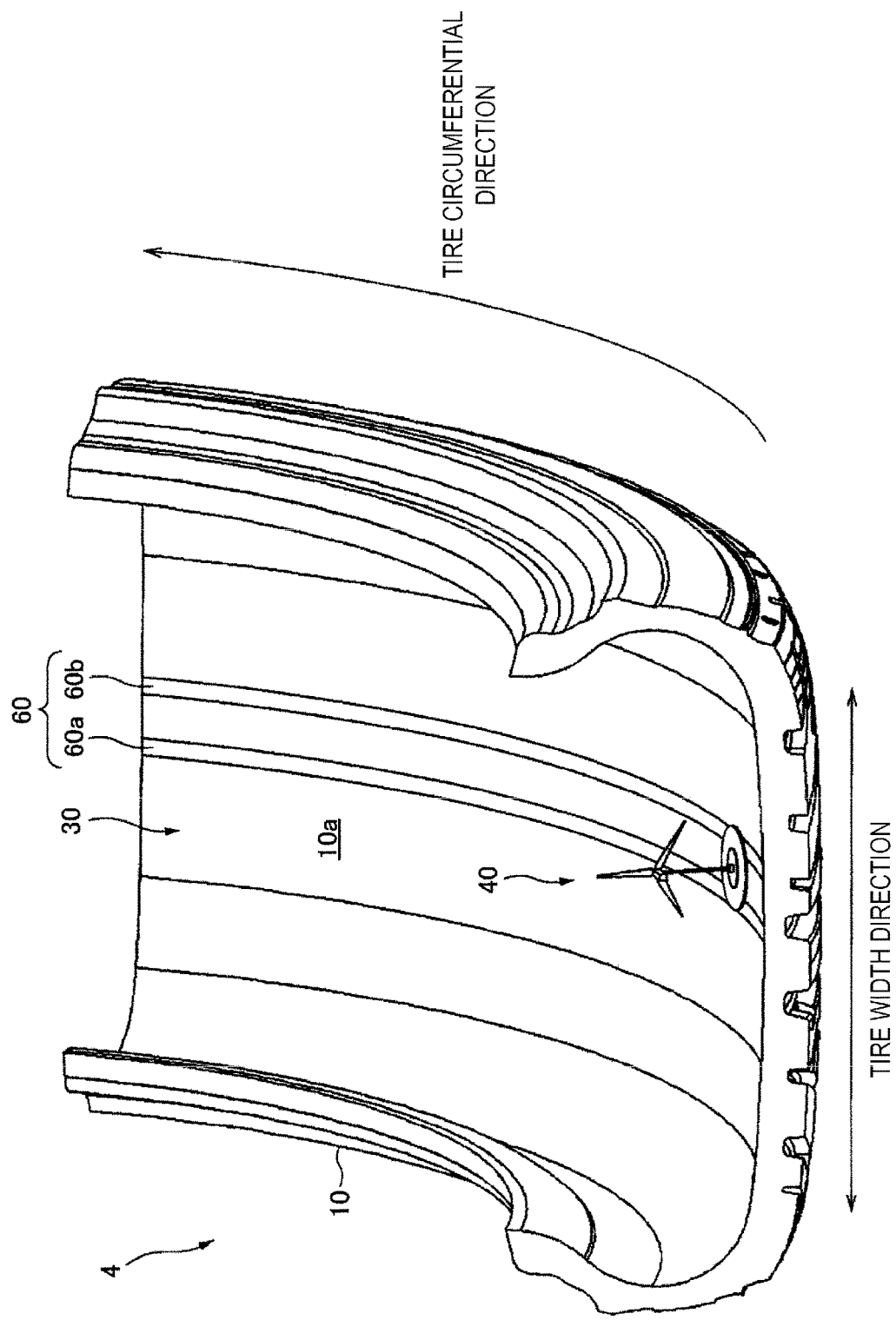
FIG. 7 is a see-through perspective view illustrating a power generation system in which a generator wind turbine is arranged between rails attached to an inner surface of a tire such that the generator wind turbine can slide in a circumferential direction of the tire.

A structure in which, for example, two rails 60a and 60b that extend in the circumferential direction of the tire are attached to the inner surface 10a of the pneumatic tire 10, and the generator wind turbine 40 is arranged between the rails 60a and 60b so as to slide thereon, such as that illustrated in FIG. 7, can be given as an example of a structure that enables the generator wind turbine 40 to slide relative to the pneumatic tire 10 or the wheel 20. That is, FIG. 7 is a see-through perspective view illustrating a power generation system 4 in which the generator wind turbine 40 is arranged between the rails 60a and 60b attached to the inner surface 10a of the tire 10 such that the generator wind turbine 40 can slide in the circumferential direction of the tire. Although not illustrated in FIG. 7, note that the rails 60a and 60b may be attached to the wheel surface 20a so as to extend in the circumferential direction of the tire, and the generator wind turbine 40 may be arranged on the rails 60a and 60b so as to be capable of sliding in the circumferential direction of the tire.

The rails 60a and 60b can be fixed to the inner surface 10a of the pneumatic tire 10 or fixed to the wheel surface 20a by, for example, fixing a rear surface of one part (a hook-like part) of a removable surface fastener (not illustrated) to the inner surface 10a of the pneumatic tire 10 (or the wheel surface 20a), attaching the rails 60 to a rear surface of the other part (a loop-like part) of the surface fastener, and connecting those two parts.

The rails 60a and 60b can be formed from at least one of a metal, rubber, and a resin. In the particular case where the rails 60a and 60b are to be fixed to the inner surface 10a of the pneumatic tire 10 and the rails 60a and 60b are formed from rubber or a resin, the rails 60a and 60b can be vulcanization bonded to the inner surface 10a of the pneumatic tire 10.

In the present embodiment, the generator wind turbine 40 can slide in the circumferential direction of the tire relative to at least one of the pneumatic tire 10 and the wheel 20, and thus if the generator wind turbine 40 is capable of sliding freely rather than being fixed to the rails 60a and 60b, the generator wind turbine 40 will exhibit rotational behavior different from that of the pneumatic tire 10. The generator wind turbine 40 will not be affected by the state of rolling motion of the tire, and due to the effect of gravitational force, the generator wind turbine 40 will always be in a position closest to the ground.

Therefore, according to the present embodiment, power can be generated as long as the gas has rotation speed, and thus power can be generated efficiently at all times from the first tire rotation period to the third tire rotation period indicated in FIG. 5.

Additional Embodiment 4

In the Basic Embodiment and an embodiment in which Additional Embodiment 1 or the like has been added to the Basic Embodiment, it is preferable that a dimension of the above-described generator wind turbine 40 in the tire radial direction be no less than 15% and no greater than 75% of the cross-sectional height of the tire (Additional Embodiment 4). Note that in the case where the generator wind turbine 40 is attached to the wheel surface 20a of the wheel 20, the dimension of the generator wind turbine 40 in the tire radial direction according to the present embodiment refers to a dimension in a state where the generator wind turbine 40 stands upright from the wheel surface 20a via the tower part 44 in the tire radial direction and is exposed to wind in the cavity 30. Meanwhile, in the case where the generator wind turbine 40 is attached to the inner surface 10a of the pneumatic tire 10, the dimension of the generator wind turbine 40 in the tire radial direction refers to a dimension in a state where the generator wind turbine 40 stands upright from the inner surface 10a via the tower part 44 in the tire radial direction and is exposed to wind in the cavity 30. Additionally, the cross-sectional height of the tire is ½ a difference between an external diameter of the tire and a diameter of the rim when the pneumatic tire 10 is assembled on a specified rim, filled to the specified internal pressure, and is in an unloaded state.

Setting the above-described dimension of the generator wind turbine 40 in the tire radial direction to be no less than 15% of the cross-sectional height of the tire makes it possible to ensure that the blades 48a, 48b, and 48c illustrated in FIG. 2 have a sufficient surface area, which in turn makes it possible to further increase the power generation efficiency. Additionally, setting the above-described dimension to be no more than 75% of the cross-sectional height of the tire prevents the generator wind turbine 40 attached to the pneumatic tire 10 (or the wheel 20) from making contact with the surface of the wheel 20 (or the pneumatic tire 10) even in the case where the tire deforms while rolling, and thus the generator wind turbine 40 can be made more durable. Note that it is preferable that a dimension of the blade part 48 in the tire radial direction (an outer diameter dimension) be no less than 75% and no more than 95% of the dimension of the generator wind turbine 40 in the tire radial direction. Setting the dimension of the blade part 48 in the tire radial direction to be no less than 75% and no more than 95% of the dimension of the generator wind turbine 40 in the tire radial direction makes it possible to ensure that the blades 48*a*, 48*b*, and 48*c* illustrated in FIG. 2 have a sufficient surface area, which in turn makes it possible to further increase the power generation efficiency.

Additional Embodiment 5

In the Basic Embodiment and an embodiment in which Additional Embodiment 1 or the like has been added to the Basic Embodiment, it is preferable that a rechargeable battery that stores the electric power obtained by the above-described generator wind turbine 40 be provided (Additional Embodiment 5). Here, "rechargeable battery" refers to a battery that can store electricity by being charged and then be used as a battery, and that can be used repeatedly.

Figure 8A:
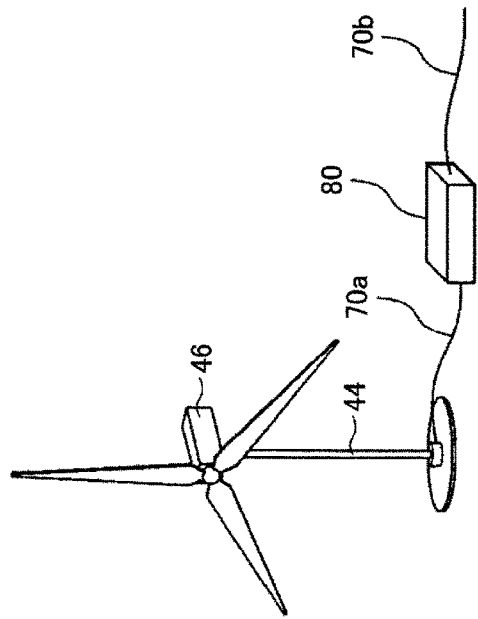
FIGS. 8A to 8D are perspective views illustrating variations on supply types for electric power obtained from the generator wind turbine illustrated in FIG. 2, where
Figure 8B:
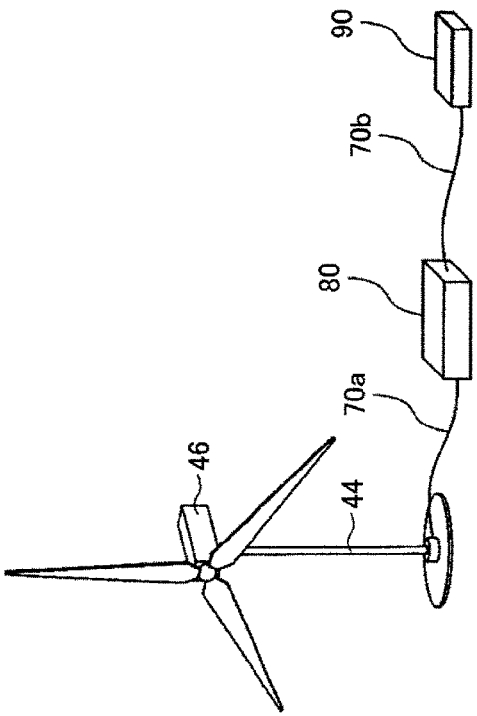
Figure 8C:
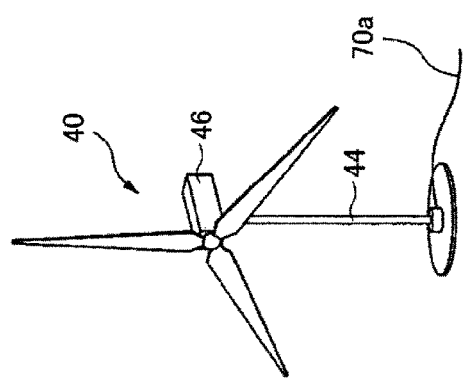
Figure 8D:
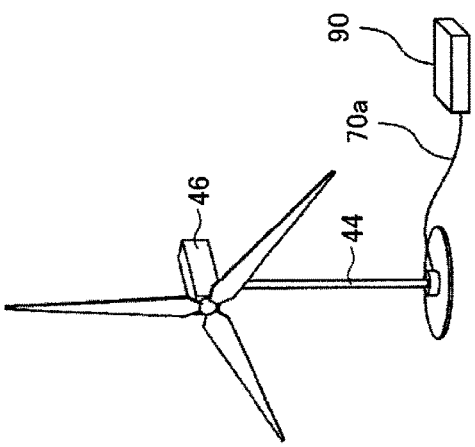

FIGS. 8A to 8D are perspective views illustrating several supply types for electric power obtained from the generator wind turbine 40 illustrated in FIG. 2. In FIGS. 8A to 8D, the generator wind turbine 40 supplies electric power generated by the power generator 46*c* of the nacelle 46 to the exterior of the generator wind turbine 40 via the interior of the hollow tower part 44. Here, FIG. 8A illustrates a type that supplies electric power from the generator wind turbine 40 directly to the exterior of the cavity 30 via an electric power line 70*a*, which can be used, for example, in the case of supplying power to a vehicle main body (not illustrated). Meanwhile, FIG. 8B illustrates a type that supplies electric power from the generator wind turbine 40 to the exterior via an electric power line 70*b* after first storing electricity in the rechargeable battery 80 via the electric power line 70*a*, which can be used in the same application as the type illustrated in FIG. 8A. Furthermore, FIG. 8C illustrates a type that supplies electric power from the generator wind turbine 40 directly to various sensors 90 within the system via the electric power line 70*a*, which can be used, for example, in the case of supplying power to a transmitter circuit of an air pressure sensor installed in the system. Additionally, FIG. 8D illustrates a type that supplies electric power from the generator wind turbine 40 to the various sensors 90 within the system via the electric power line 70*b* after first storing electricity in the rechargeable battery 80 via the electric power line 70*a*, which can be used in the same application as the type illustrated in FIG. 8C.

The present embodiment corresponds to the types illustrated in FIGS. 8B and 8D. Providing a rechargeable battery that stores the electric power obtained by the generator wind turbine 40 in this manner makes it possible to supply electric power to the interior or exterior of the power generation system 2 (the cavity 30) even during time periods when power is not being generated. Note that the "interior" of the power generation system 2 refers to the various sensors 90, or, for example, in the case where a sensor that monitors a state of the power generation in the nacelle 46 (the rotation of the rotation shaft 46*a*) is installed, electric power may be supplied thereto.

Additional Embodiment 6

In the Basic Embodiment and an embodiment in which Additional Embodiment 1 or the like has been added to the Basic Embodiment, it is preferable that a spoke of the above-described wheel 20 have a hollow region and an electric power line extends from the above-described generator wind turbine 40 to the exterior of the power generation system via the above-described hollow region (Additional Embodiment 6).

Figure 9:
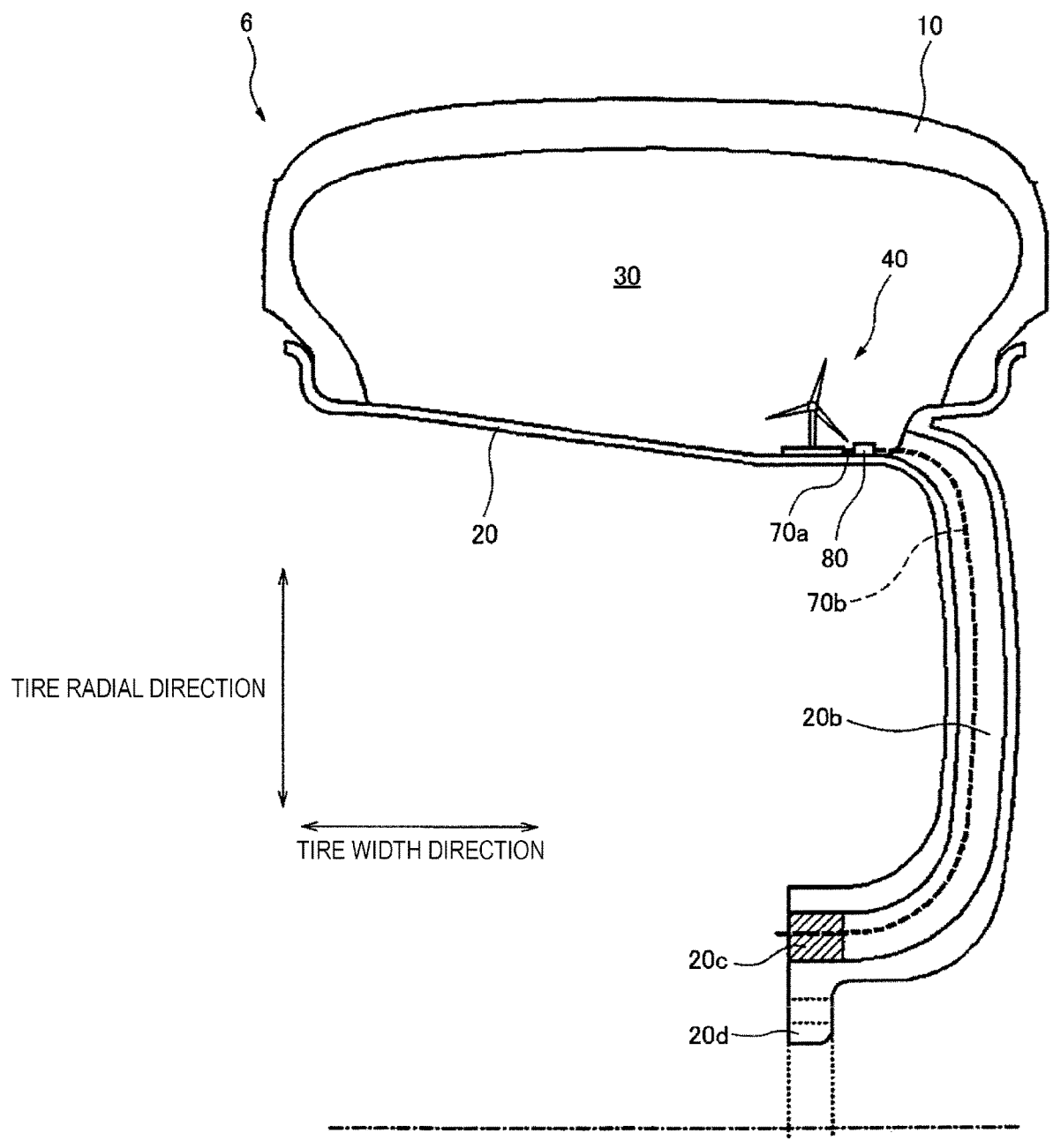
FIG. 9 is a meridian cross-sectional view of a tire illustrating an example of a type of power generation system in which an electric power line is disposed in a hollow region of a wheel.

FIG. 9 is a meridian cross-sectional view of a tire illustrating an example of a type of power generation system in which an electric power line is disposed in a hollow region of a wheel. In FIG. 9, reference sign 6 indicates the power generation system, reference sign 10 indicates the pneumatic tire, reference sign 20 indicates the wheel, reference sign 20*b* indicates the hollow region formed in a spoke of the wheel 20, reference sign 20*c* indicates a pressure bulkhead for keeping the hollow region 20*b* sealed, reference sign 40 indicates the generator wind turbine, reference signs 70*a* and 70*b* indicate the electric power lines, and reference sign 80 indicates the rechargeable battery.

The example illustrated in FIG. 9 is an example of the electric power supply type illustrated in FIG. 8B. As illustrated in FIG. 9, extending the electric power line 70*b* from the generator wind turbine 40 to the exterior of the power generation system 6 via the hollow region 20*b* in the spoke of the wheel 20 makes it possible to supply electric power to a battery of an electric vehicle, a hybrid car, a vehicle provided with an electric power regeneration system, or the like.

Note that a structure in which a mechanism such as a slip ring is provided in a hub attachment portion 20*d* attached to a hub (not illustrated) that is linked to the wheel 20 via spokes and is located on the axle shaft side, and the electric power line 70*b* is extended to the vehicle battery from the cavity 30 via the hollow region 20*b* of the spoke of the wheel 20 and an axle shaft in sequence, can be given as a specific structure for supplying electric power to the battery of a vehicle. In other words, extending the electric power line 70*b* from the generator wind turbine 40 to the exterior of the power generation system 2 via the hub attachment portion 20*d* makes it possible to supply power to the vehicle via the hub attachment portion 20*d*, which in turn makes it possible to save energy in the vehicle. Although the configuration may, in the case where power is supplied to the vehicle via the hub attachment portion 20*d*, be such that the electric power line 70*b* is extended to the exterior of the generator wind turbine 40 via the hollow region 20*b* in the spoke of the wheel 20, note that the electric power line 70*b* may instead be extended to the hub attachment portion 20*d* without traversing the hollow region 20*b* in the spoke.

Additional Embodiment 7

In the Basic Embodiment and an embodiment in which Additional Embodiment 1 or the like has been added to the Basic Embodiment, it is preferable that the above-described generator wind turbine 40 include a blade part, a cylindrical main body formed in the periphery of the stated blade part, and a flange formed in one edge portion of the stated cylindrical main body (Additional Embodiment 7).

Figures 1, 10:
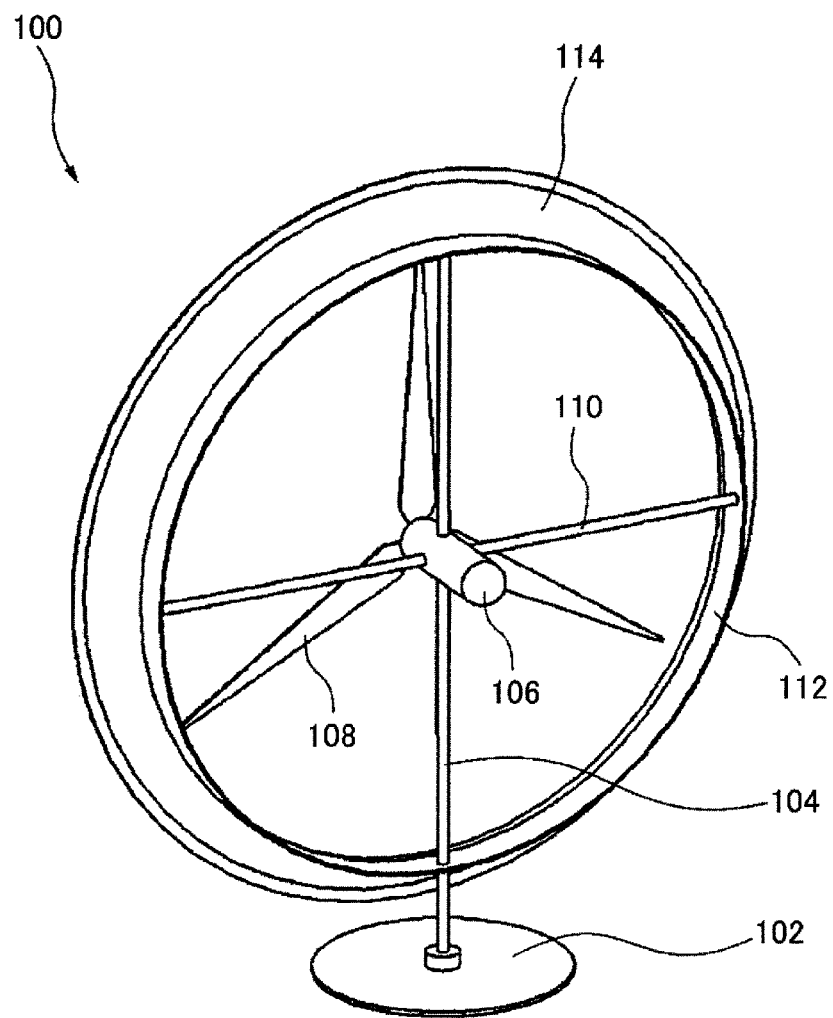
Figures 2, 10:
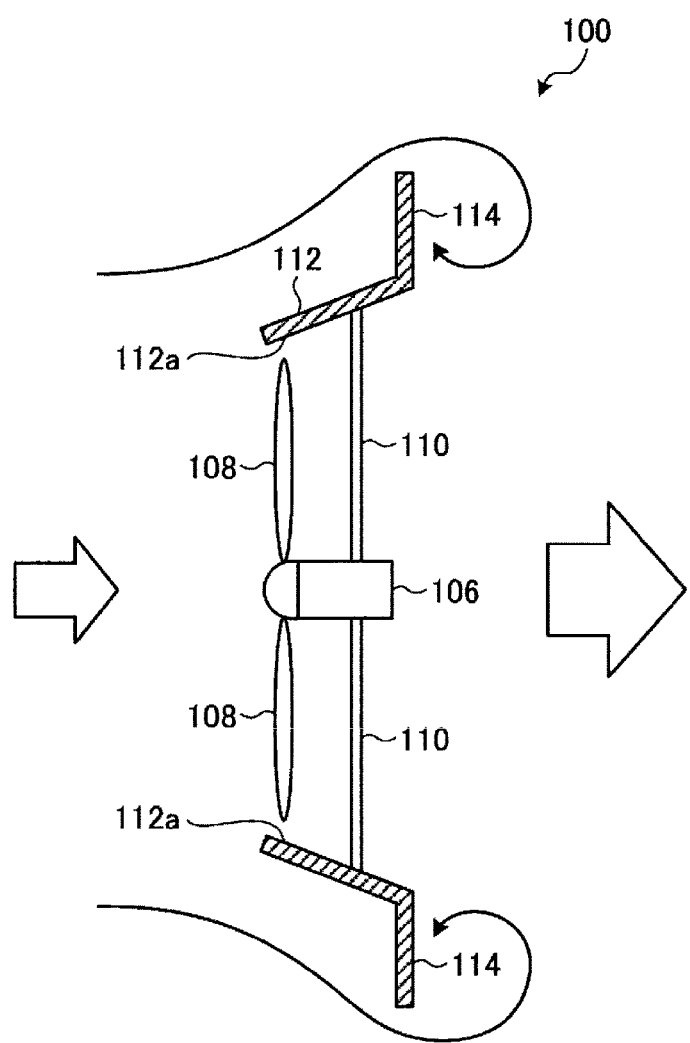

FIG. 10-1 is a perspective view illustrating a modified example of the generator wind turbine 40 illustrated in FIG. 2. FIG. 10-2 is a side cross-sectional view of the generator wind turbine 40 illustrated in FIG. 10-1. In FIGS. 10-1 and 10-2, reference sign 100 indicates a generator wind turbine, reference sign 102 indicates a base part, reference sign 104 indicates a tower part, reference sign 106 indicates a nacelle, and reference sign 108 indicates the blade part.

Additionally, in the generator wind turbine 100 illustrated in FIGS. 10-1 and 10-2, four supporting columns 110 extend radially central to the nacelle 106. Additionally, outer sides of the supporting columns 110 in the radiation direction thereof are linked to a cylindrical main body 112, and the cylindrical main body 112 is disposed covering the periphery of the blade part 108. Furthermore, a plate-shaped flange 114 extending toward an outer side of the cylindrical main body 112 is formed at an edge portion of one opening in the cylindrical main body 112.

By including the cylindrical main body 112 and the flange 114 in the generator wind turbine 100 in this manner, when a gas flows from another opening located on the side where the flange 114 is not formed toward the one opening where the flange 114 is formed, the gas collides with the flange 114 on an outer side of the cylindrical main body 112 on the one opening side, generating a vortex on a downstream side of the flange 114, as illustrated in FIG. 10-2. This results in a lower pressure, which produces an effect of pulling the gas from the other opening toward the one opening on an inner side of the cylindrical main body 112. In other words, atmospheric pressure in the vicinity of the edge portion at the one opening located on the side of the cylindrical main body 112 where the flange 114 is formed (that is, a flange vicinity) can be made lower than atmospheric pressure in the vicinity of the edge portion at the other opening located on the side where the flange 114 is not formed (a non-flange vicinity). As a result, an airflow from the non-flange vicinity, which is at a comparative high pressure, to the flange vicinity, which is at a comparatively low pressure, is produced, and the rotation speed of the gas (gas speed) can be increased locally in the vicinity of the generator wind turbine 100. As such, according to the present embodiment, a high-speed gas acts on the generator wind turbine 100, and thus the generator wind turbine 100 can be moved relative to the gas at a higher level. This increases the rotation speed of the rotation shaft of the nacelle 106, increasing the amount of power generated by the power generator and making it possible to obtain electric power even more efficiently.

Note that in the cylindrical main body 112 illustrated in FIG. 10-2, making an inner diameter of the flange vicinity opening greater than an inner diameter of the non-flange vicinity opening so as to provide a taper 112a therebetween makes it possible, when the gas travels from the small-diameter side to the large-diameter side, to cause the gas to collide with the flange 114 more, and a broader region of low pressure can be produced in the vicinity of the flange 114. As such, the rotation speed of the gas (the gas speed) can be further increased locally in the vicinity of the generator wind turbine 100. Therefore, the generator wind turbine 100 can be moved relative to the gas at an extremely high level, which further increases the rotation speed of the rotation shaft in the nacelle 106 and increases the amount of power generated by the power generator, making it possible to obtain electric power extremely efficiently.

Other Additional Embodiments

Furthermore, other preferred Additional Embodiments that can be optionally implemented instead of the Basic Embodiment of the power generation system according to the present technology described above, will be described.
(Generator Wind Turbine Types)

Figure 11A:
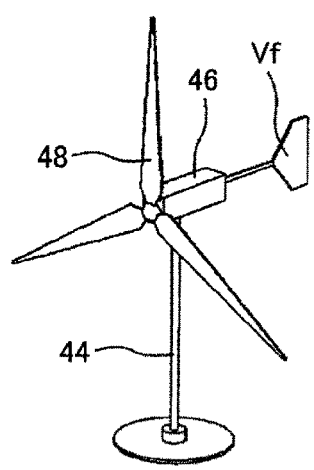
FIGS. 11A to 11F are perspective views illustrating the appearances of generator wind turbines that can be applied in the power generation system according to the present technology, where

In the present technology, the generator wind turbine is not limited to the type illustrated in FIG. 2 or the type illustrated in FIGS. 10-1 and 10-2. FIGS. 11A to 11F are perspective views illustrating the appearances of generator wind turbines that can be applied in the power generation system according to the present technology. FIG. 11A is a modified example of the propeller type illustrated in FIG. 2, and is an example in which, in the example illustrated in FIG. 2, the nacelle 46 can be rotated in a horizontal plane relative to the tower part 44 and a vertical tail fin Vf is attached on the side of the nacelle 46 opposite from the blade part 48. In the example illustrated in FIG. 11A, the nacelle 46 and the blade part 48 yaw when the vertical tail fin Vf is exposed to a sideways wind. The blade part 48 can therefore be oriented efficiently in a direction that directly receives the airflow, which makes it possible to obtain electric power even more efficiently.

Figure 11B:
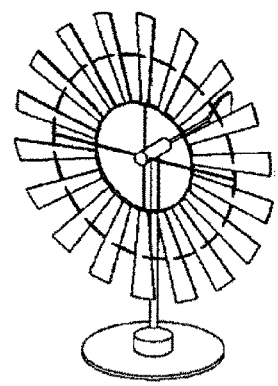
Figure 11C:
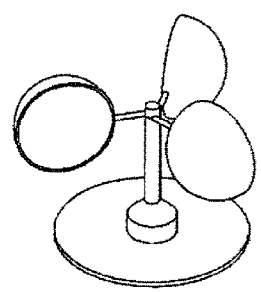
Figure 11D:
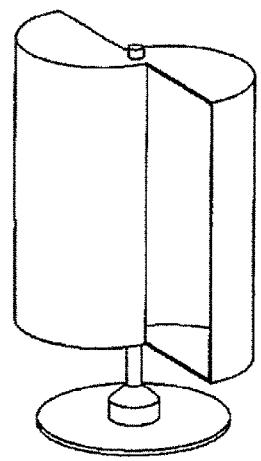
Figure 11E:
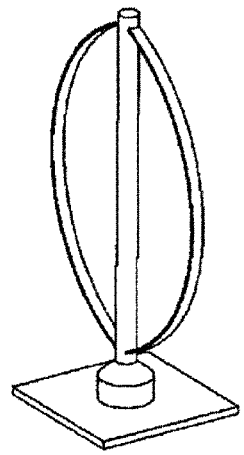
Figure 11F:
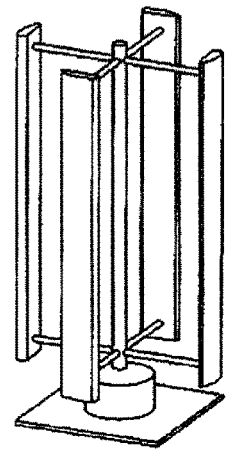

In addition, the multiblade type illustrated in FIG. 11B, the paddle type illustrated in FIG. 11C, the Savonius type illustrated in FIG. 11D, the Darrieus type illustrated in FIG. 11E, and the gyromill type illustrated in FIG. 11F can be given as examples of other generator wind turbines that can be applied in the power generation system according to the present technology. When the tire is rolling, centrifugal force on the outside in the tire radial direction acts on the axis of rotation of the blades in the generator wind turbine as well; of the various types of generator wind turbines described above, the direction in which the axis of rotation of the blades extends matches the direction in which the stated centrifugal force acts in the generator wind turbines illustrated in FIGS. 11C to 11F. Therefore, the centrifugal force in the tire radial direction, produced when the tire rolls, does not cause the rotation direction of the axis of rotation of the blades to deviate from a desired direction, and a high level of durability can be realized in the generator wind turbine.

Note that the examples in which the direction in which the axis of rotation of the blades extends in perpendicular to the tire radial direction, such as those illustrated in FIGS. 11A and 11B, include not only examples in which the blades do not have the same shape when viewed from the outside in the tire radial direction and when viewed from the inside in the tire radial direction, but also include examples in which the blades have the same shape. With respect to the former, the blades rotate only when exposed to wind from one side of the blades in the circumferential direction of the tire, whereas with respect to the latter, the blades rotate in either direction when exposed to wind from either side of the blades in the circumferential direction of the tire. As opposed to this, in examples in which the direction in which the axis of rotation of the blades extends is parallel to the tire radial direction, such as those illustrated in FIGS. 11C to 11F, the blades rotate in either direction when exposed to wind from either side of the blades in the circumferential direction of the tire, regardless of the shape of the blades.
(Number of Blades Included in Blade Part of Generator Wind Turbine)

In the present technology, the number of blades included in the blade part of the generator wind turbine is not limited to the numbers indicated in FIGS. 2, 10-1 and 10-2, and 11A to 11F, but it is preferable that the number be set to no less than two and no greater than 20. Setting the number of blades to no less than two makes it possible to give the blade part excellent rotational balance, which makes it possible to increase the durability of the rotor head 48X and the rotor hub 48Y corresponding to a shaft of the blade part 48 illustrated in FIG. 3. Meanwhile, setting the number of blades to no greater than 20 suppresses an excessive increase in wind pressure acting on the blade part as a whole, which ensures that the above-described rotor head 48X and rotor hub 48Y are not subjected to excessive forces and thus makes it possible to make the constituents 48X and 48Y more durable.

Note that the above-described effects can be achieved at an even higher level by setting the number of blades included in the blade part of the generator wind turbine to no less than three and no greater than 10.

(Wind-Exposed Surface Area of Blade Part of Generator Wind Turbine)

In the present technology, it is preferable that a wind-exposed surface area of the blade part of the generator wind turbine be no less than 1% and no more than 35% of the area of the cavity (that is, the cross-sectional area of the cavity 30) in a meridian cross-sectional view of the tire, when the pneumatic tire is mounted on a specified rim and given the specified internal pressure, and is in an unloaded state. Here, the "wind-exposed surface area" of the blade part refers to the surface area of the largest circle formed by the blade part when the blade part rotates being projected onto the meridian cross-section of the tire.

Setting the wind-exposed surface area of the blade part to no less than 1% of the area of the cavity makes it possible to efficiently convert wind power into electric power and realize a sufficient power generation efficiency. On the other hand, setting the wind-exposed surface area of the blade part to no more than 35% of the area of the cavity makes it possible to realize a high power generation efficiency without an excessive increase in the weight of the power generation system.

(Arrangements of Generator Wind Turbine in Circumferential Direction of Tire)

In the present technology, the arrangement of the generator wind turbine in the circumferential direction of the tire is not limited to the type illustrated in FIG. 1. FIGS. 12A to 12F are side cross-sectional views illustrating arrangements of the generator wind turbines in the circumferential direction of the tire that can be applied in the power generation system according to the present technology. FIGS. 12A and 12B are examples in which the generator wind turbines are attached to the wheel, FIGS. 12C, 12D, and 12E are examples in which the generator wind turbines are attached to the pneumatic tire, and FIG. 12F is an example in which the generator wind turbines are attached to both the wheel and the pneumatic tire. Note that in FIGS. 12A to 12F, reference sign 10 indicates the pneumatic tire, reference sign 20 indicates the wheel, reference sign 30 indicates the cavity, and reference sign 40 indicates the generator wind turbine.

Among these examples, the examples illustrated in FIGS. 12A, 12B, 12D, and 12E in particular have the generator wind turbines 40 arranged at equal intervals in the tire circumferential direction in the same positions in the tire radial direction, and are thus preferable in terms of realizing superior performance with respect to uniformity. Note that in the case where the power generation system is also provided with a rechargeable battery, a transmitter circuit of an air pressure sensor, or the like, it is preferable to employ an arrangement, in the combination of the generator wind turbines and the battery and circuit, that minimizes weight differences in the power generation system in the circumferential direction of the tire to the greatest extent possible.

Additionally, in the case where the number of generator wind turbines arranged in a single power generation system is eight or less, the airflow during tire rotation can be made sufficiently laminar, which makes it possible to obtain electric power efficiently. Furthermore, in the case where the number of generator wind turbines is set to eight or less, an increase in the weight of the power generation system itself can be suppressed, which in turn makes it possible to realize superior performance with respect to rolling resistance.

(Arrangements of Generator Wind Turbine in Width Direction of Tire)

Figure 13A:
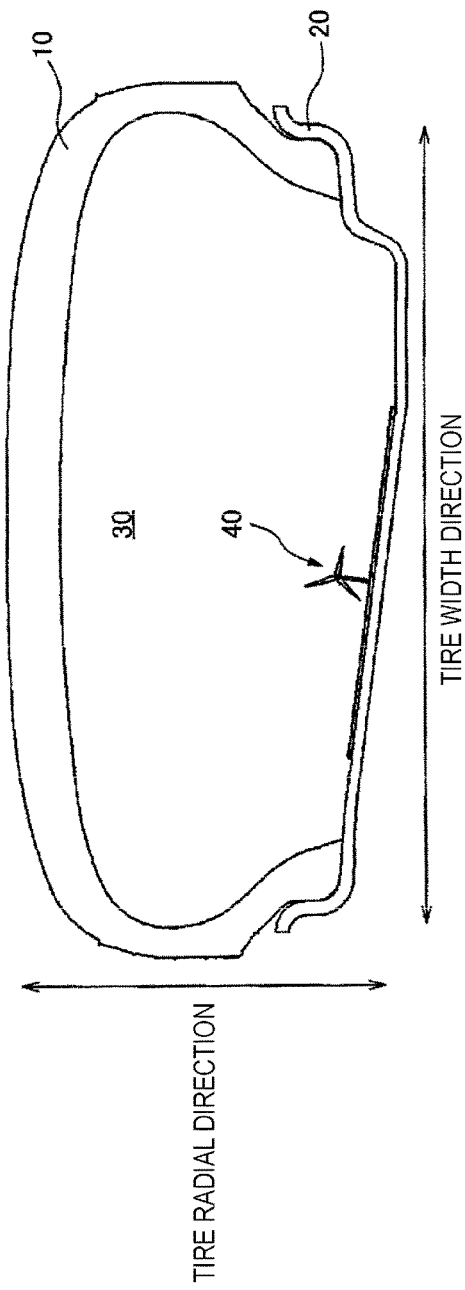
FIGS. 13A and 13B are side cross-sectional views illustrating arrangements of generator wind turbines in the width direction of a tire that can be applied in the power generation system according to the present technology, where
Figure 13B:
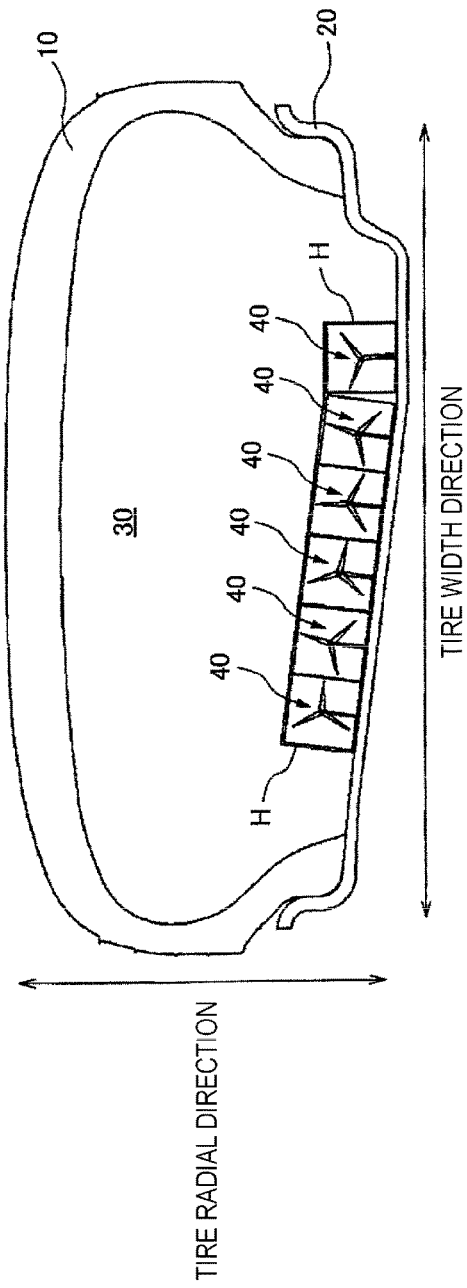

In the present technology, the arrangement of the generator wind turbine in the width direction of the tire is not limited to the types illustrated in FIGS. 7 and 9. FIGS. 13A and 13B are side cross-sectional views illustrating arrangements of the generator wind turbines in the width direction of the tire that can be applied in the power generation system according to the present technology. Note that in FIGS. 13A and 13B, reference sign 10 indicates the pneumatic tire, reference sign 20 indicates the wheel, reference sign 30 indicates the cavity, reference sign 40 indicates the generator wind turbine, and reference sign H indicates a partition member.

FIG. 13A illustrates an example in which a single generator wind turbine is disposed in the wheel, and is the most preferable example in terms of achieving superior performance with respect to the weight of the power generation system and rolling resistance.

On the other hand, FIG. 13B illustrates an example in which a plurality of the generator wind turbines are disposed in the wheel, with generator wind turbines 40 adjacent in the tire width direction being disposed in spaces defined by the tubular partition members H. As a result, interference between airflows produced by adjacent generator wind turbines 40 and 40 can be kept to a minimum, which makes it possible to bring the airflow closer to a laminar flow across the tire circumferential direction as a whole; this in turn makes it possible to obtain electric power efficiently.

EXAMPLES

Working Example Group 1

Working Example Group 1 relates to a plurality of working examples of a type in which the generator wind turbine is fixed to the wheel.

Assuming a tire size of 215/60 R16, a rim size of 16×6.5j, and furthermore an air pressure of 230 kPa, power generation systems according to Working Example 1 to Working Example 7 were manufactured to satisfy the conditions set forth in Table 1 below.

Meanwhile, the vehicle illumination device disclosed in Japanese Unexamined Patent Application Publication Nos. 2004-90884A was manufactured with the same tire size, rim size, and air pressure as described above with respect to the Working Examples, and this device was taken as a power generation system according to a Conventional Example.

The power generation systems according to Working Example 1 to Working Example 7 and the Conventional Example manufactured in this manner were then attached to a drum test machine, accelerated to 60 km/h in 8 seconds, run at that speed constantly for 30 seconds, and then decelerated for 8 seconds and stopped. Amounts of electric power obtained during that time were then measured. Then, index evaluation was carried out on the basis of the measured results using the Conventional Example as a reference (100). In this evaluation, a higher index value indicates that a greater amount of electric power has been obtained. Results are shown in Table 1.

TABLE 1

| | Conventional Example | Working Example 1 | Working Example 2 | Working Example 3 |
|---|---|---|---|---|
| Attachment position of generator wind turbine | Tire outer side | Wheel inside cavity | Wheel inside cavity | Wheel inside cavity |
| Generator wind turbine able to rotate relative to straight line parallel to tire rotation axis | Unable to be completely fixed | Unable to be completely fixed | Able | Unable to be completely fixed |
| Dimension of generator wind turbine in tire radial direction relative to cross-sectional height of the tire (%) | 180+ | 10 | 10 | 45 |
| Does generator wind turbine include cylindrical main body formed in periphery of blade part and flange formed at one edge portion of cylindrical main body | Not included | Not included | Not included | Not included |
| Number of blades in generator wind turbine (blades) | 2 | 2 | 2 | 2 |
| Arrangement of generator wind turbines in tire circumferential direction | — | FIG. 12A | FIG. 12A | FIG. 12A |
| Arrangement of generator wind turbines in tire width direction | — | FIG. 13A | FIG. 13A | FIG. 13A |
| Amount of electric power obtained (index) | 100 | 122 | 122 | 257 |

| | Working Example 4 | Working Example 5 | Working Example 6 | Working Example 7 |
|---|---|---|---|---|
| Attachment position of generator wind turbine | Wheel inside cavity | Wheel inside cavity | Wheel inside cavity | Wheel inside cavity |
| Generator wind turbine able to rotate relative to straight line parallel to tire rotation axis | Unable to be completely fixed | Unable to be completely fixed | Unable to be completely fixed | Unable to be completely fixed |
| Dimension of generator wind turbine in tire radial direction relative to cross-sectional height of the tire (%) | 45 | 45 | 45 | 45 |
| Does generator wind turbine include cylindrical main body formed in periphery of blade part and flange formed at one edge portion of cylindrical main body | Included | Included | Included | Included |
| Number of blades in generator wind turbine (blades) | 2 | 3 | 3 | 3 |
| Arrangement of generator wind turbines in tire circumferential direction | FIG. 12A | FIG. 12A | FIG. 12B | FIG. 12B |
| Arrangement of generator wind turbines in tire width direction | FIG. 13A | FIG. 13A | FIG. 13A | FIG. 13B |
| Amount of electric power obtained (index) | 285 | 314 | 608 | 3240 |

With respect to a type in which the generator wind turbine is fixed to the wheel, it can be seen from Table 1 that all of the power generation systems according to Working Example 1 to Working Example 7, which fall within the technical scope of the present technology (that is, in which improvements have been made on the mounting position of the generator wind turbine for obtaining electric power), can convert wind power to electric power more efficiently than the power generation system according to the Conventional Example, which does not fall within the technical scope of the present technology.

Working Example Group 2

Working Example Group 2 relates to a plurality of working examples of a type in which the generator wind turbine can slide relative to the wheel.

Assuming a tire size of 215/60 R16, a rim size of 16×6.5j, and furthermore an air pressure of 230 kPa, power generation systems according to Working Example 8 to Working Example 12 were manufactured to satisfy the conditions set forth in Table 2 below.

Meanwhile, the vehicle illumination device disclosed in Japanese Unexamined Patent Application Publication Nos.

2004-90884A was manufactured with the same tire size, rim size, and air pressure as described above with respect to the Working Examples, and this device was taken as a power generation system according to a Conventional Example.

The power generation systems according to Working Example 8 to Working Example 12 and the Conventional Example manufactured in this manner were then attached to a drum test machine, accelerated to 60 km/h in 8 seconds, run at that speed constantly for 30 seconds, and then decelerated for 8 seconds and stopped. Amounts of electric power obtained during that time were then measured. Then, index evaluation was carried out on the basis of the measured results using the Conventional Example as a reference (100). In this evaluation, a higher index value indicates that a greater amount of electric power has been obtained. Results are shown in Table 2.

TABLE 2

|  | Conventional Example | Working Example 8 | Working Example 9 |
|---|---|---|---|
| Attachment position of generator wind turbine | Tire outer side | Wheel inside cavity | Wheel inside cavity |
| Dimension of generator wind turbine in tire radial direction relative to cross-sectional height of the tire (%) | 180 | 10 | 45 |
| Does generator wind turbine include cylindrical main body formed in periphery of blade part and flange formed at one edge portion of cylindrical main body | Not included | Not included | Included |
| Number of blades in generator wind turbine (blades) | 2 | 2 | 2 |
| Arrangement of generator wind turbines in tire circumferential direction | — | FIG. 12A | FIG. 12A |
| Arrangement of generator wind turbines in tire width direction | — | FIG. 13A | FIG. 13A |
| Amount of electric power obtained (index) | 100 | 166 | 340 |

|  | Working Example 10 | Working Example 11 | Working Example 12 |
|---|---|---|---|
| Attachment position of generator wind turbine | Wheel inside cavity | Wheel inside cavity | Wheel inside cavity |
| Dimension of generator wind turbine in tire radial direction relative to cross-sectional height of the tire (%) | 45 | 45 | 45 |
| Does generator wind turbine include cylindrical main body formed in periphery of blade part and flange formed at one edge portion of cylindrical main body | Included | Included | Included |
| Number of blades in generator wind turbine (blades) | 3 | 3 | 3 |
| Arrangement of generator wind turbines in tire circumferential direction | FIG. 12A | FIG. 12B | FIG. 12B |
| Arrangement of generator wind turbines in tire width direction | FIG. 13A | FIG. 13A | FIG. 13B |
| Amount of electric power obtained (index) | 383 | 755 | 3940 |

With respect to a type in which the generator wind turbine can slide relative to the wheel, it can be seen from Table 2 that all of the power generation systems according to Working Example 8 to Working Example 12, which fall within the technical scope of the present technology (that is, in which improvements have been made on the mounting position of the generator wind turbine for obtaining electric power), can convert wind power to electric power more efficiently than the power generation system according to the Conventional Example, which does not fall within the technical scope of the present technology.

The invention claimed is:

1. A power generation system, comprising:
    a pneumatic tire;
    a wheel on which the pneumatic tire is mounted; and
    at least one generator wind turbine attached to the wheel in a cavity defined by the pneumatic tire and the wheel and can rotate relative to a straight line parallel to an axis of rotation of the tire, wherein the generator wind turbine includes a blade part, a cylindrical main body formed in a periphery of the blade part, and a flange formed in one edge portion of the cylindrical main body.

2. The power generation system according to claim 1, wherein a dimension of the generator wind turbine in a tire radial direction is no less than 15% and no more than 75% of a cross-sectional height of the tire.

3. The power generation system according to claim 2, wherein a dimension of a blade part of the generator wind turbine in the tire radial direction is no less than 75% and no more than 95% of the dimension of the generator wind turbine in the tire radial direction.

4. The power generation system according to claim 3, further comprising a rechargeable battery that stores electric power obtained by the generator wind turbine.

5. The power generation system according to claim 4, wherein a spoke of the wheel has a hollow region and an electric power line extends from the generator wind turbine to an exterior of the power generation system via the hollow region.

6. The power generation system according to claim 5, wherein the electric power line extends from the generator wind turbine to the exterior of the power generation system via a hub of the wheel.

7. The power generation system according to claim 1, further comprising a rechargeable battery that stores electric power obtained by the generator wind turbine.

8. The power generation system according to claim 1, wherein a spoke of the wheel has a hollow region and an electric power line extends from the generator wind turbine to an exterior of the power generation system via the hollow region.

9. The power generation system according to claim 1, wherein an electric power line extends from the generator wind turbine to an exterior of the power generation system via a hub of the wheel.

10. A power generation system, comprising:
    a pneumatic tire;
    a wheel on which the pneumatic tire is mounted; and
    at least one generator wind turbine attached to the pneumatic tire and/or the wheel in a cavity defined by the pneumatic tire and the wheel, wherein:
        the generator wind turbine includes a blade part, a cylindrical main body formed in a periphery of the blade part, and a flange formed in one edge portion of the cylindrical main body; and
        the generator wind turbine can slide relative to the pneumatic tire or the wheel.

11. The power generation system according to claim 10, wherein a dimension of the generator wind turbine in a tire radial direction is no less than 15% and no more than 75% of a cross-sectional height of the tire.

12. The power generation system according to claim 11, wherein a dimension of a blade part of the generator wind turbine in the tire radial direction is no less than 75% and no more than 95% of the dimension of the generator wind turbine in the tire radial direction.

13. The power generation system according to claim 10, further comprising a rechargeable battery that stores electric power obtained by the generator wind turbine.

14. The power generation system according to claim 10, wherein a spoke of the wheel has a hollow region and an electric power line extends from the generator wind turbine to an exterior of the power generation system via the hollow region.

15. The power generation system according to claim 10, wherein an electric power line extends from the generator wind turbine to an exterior of the power generation system via a hub of the wheel.

\* \* \* \* \*